(12) United States Patent
Dai et al.

(10) Patent No.: US 11,046,832 B2
(45) Date of Patent: Jun. 29, 2021

(54) METHOD OF MANUFACTURING MODIFIED SILICON DIOXIDE NANOPARTICLES

(71) Applicant: Xiamen University, Fujian (CN)

(72) Inventors: Lizong Dai, Fujian (CN); Chao Liu, Fujian (CN); Guorong Chen, Fujian (CN); Jiamei Huang, Fujian (CN); Zhongyu Li, Fujian (CN); Conghui Yuan, Fujian (CN); Yiting Xu, Fujian (CN); Birong Zeng, Fujian (CN); Wei'ang Luo, Fujian (CN)

(73) Assignee: Xiamen University, Xiamen (CN)

( * ) Notice: Subject to any disclaimer, the term of this patent is extended or adjusted under 35 U.S.C. 154(b) by 86 days.

(21) Appl. No.: 16/567,295

(22) Filed: Sep. 11, 2019

(65) Prior Publication Data

US 2020/0002503 A1 Jan. 2, 2020

Related U.S. Application Data

(63) Continuation of application No. PCT/CN2018/078812, filed on Mar. 13, 2018.

(30) Foreign Application Priority Data

Mar. 13, 2017 (CN) .......................... 201710145816.7

(51) Int. Cl.
| | |
|---|---|
| *C08K 3/36* | (2006.01) |
| *C08K 9/06* | (2006.01) |
| *C08K 9/08* | (2006.01) |
| *C08K 9/10* | (2006.01) |
| *C08L 63/00* | (2006.01) |

(52) U.S. Cl.
CPC .................. *C08K 3/36* (2013.01); *C08K 9/06* (2013.01); *C08K 9/08* (2013.01); *C08K 9/10* (2013.01); *C08L 63/00* (2013.01); *C08J 2335/00* (2013.01); *C08K 2201/011* (2013.01)

(58) Field of Classification Search
CPC ... C08K 3/36; C08K 9/06; C08K 9/08; C08K 2201/011; C08K 9/10; C08J 2335/00; C08L 63/00
USPC ........................................................ 524/492
See application file for complete search history.

(56) References Cited

U.S. PATENT DOCUMENTS 8,114,508 B2    2/2012   Tzou

FOREIGN PATENT DOCUMENTS

| CN | 101585954 A |   | 11/2009 |
| CN | 104693421 A |   | 6/2015 |
| CN | 104891512 A | * | 9/2015 |
| CN | 104891512 A |   | 9/2015 |
| CN | 106832413 A |   | 6/2017 |

OTHER PUBLICATIONS

International Search Report and Written Opinion with English Translation of ISR, cited in PCT/CN2018/078812 dated Jun. 20, 2018, 9 pages.

* cited by examiner

*Primary Examiner* — Hui H Chin

(74) *Attorney, Agent, or Firm* — Cooper Legal Group, LLC

(57) ABSTRACT

The present disclosure discloses a method of manufacturing silicon dioxide nanoparticles modified by a polymer containing phosphorus and nitrogen, which relates to organic/inorganic hybrid nanoparticles, dispersing $SiO_2$ in an organic solvent, then adding THPS, stirring, and finally adding p-phenylenediamine, reacting, centrifuging, washing, and drying to obtain silicon dioxide nanoparticles modified by a polymer containing phosphorus and nitrogen. The silicon dioxide nanoparticles modified by the polymer containing phosphorus and nitrogen have effects in flame retardancy, strengthening effect of polymer matrixes, and are expected to be widely used in the halogen-free synergistic flame retardancy of polymer materials.

15 Claims, 1 Drawing Sheet

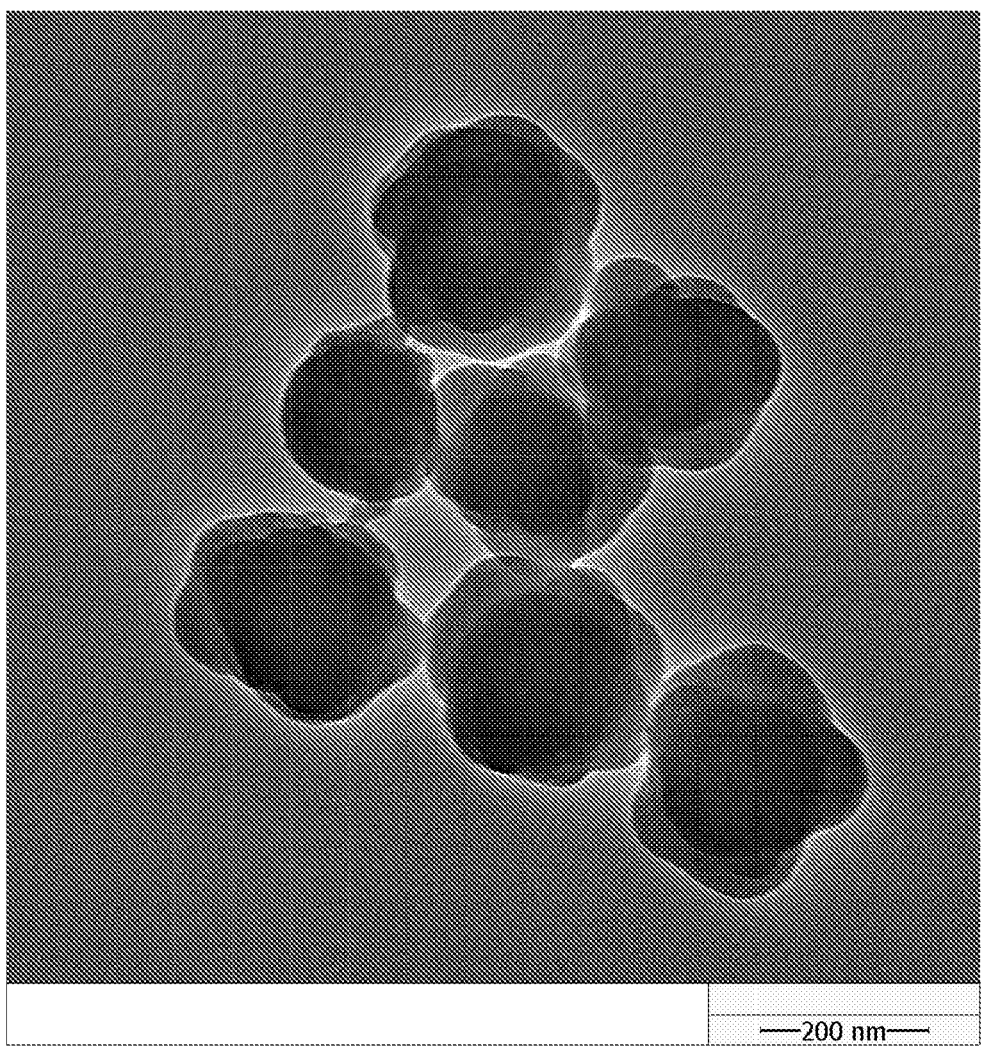

METHOD OF MANUFACTURING MODIFIED SILICON DIOXIDE NANOPARTICLES

RELATED APPLICATIONS

This application is a continuation of and claims priority to PCT Patent Application PCT/CN2018/078812, filed on Mar. 13, 2018, which claims priority to Chinese Patent Application 201710145816.7, filed on Mar. 13, 2017. PCT Patent Application PCT/CN2018/078812 and Chinese Patent Application 201710145816.7 are incorporated herein by reference.

FIELD OF THE INVENTION

The present disclosure relates to organic/inorganic hybrid nanoparticles, and more particularly, the present disclosure relates to silicon dioxide nanoparticles modified by a polymer containing phosphorus and nitrogen, a preparation method thereof and the use thereof.

BACKGROUND OF THE INVENTION

It is well known that epoxy resin has been widely used in various fields because of its excellent comprehensive performance. However, a poor flame-resistant performance of the epoxy resin limits its application range severely. Therefore, research into modifying the epoxy resin to improve the flame-retardant performance of the epoxy resin has been a hot issue. A composite system comprising flame-retardant additives containing phosphorus is widely used in the market and is used to effectively improve the flame-retardant performance of the epoxy resin through its synergistic flame-retardant effect. However, the composite system usually needs a large amount of the flame-retardant additives to achieve an ideal flame-retardant effect, but mechanical properties of the epoxy resin will decline due to the large amount of the flame-retardant additive. Therefore, it is urgent to provide new flame-retardant additives that will not affect the mechanical properties of the epoxy resin and can improve the flame-retardant performance of the epoxy resin.

SUMMARY OF THE INVENTION

To overcome the disadvantages of existing techniques, the present disclosure provides silicon dioxide nanoparticles modified by a polymer containing phosphorus and nitrogen, a manufacturing method thereof and a use thereof.

A first technical solution adopted by the present disclosure is as follows:

A method for manufacturing silicon dioxide nanoparticles modified by a polymer containing phosphorus and nitrogen, the method comprising the following steps:

1) dispersing silicon dioxide nanoparticles in an organic solvent and ultrasonically dispersing for 10-60 minutes to obtain a $SiO_2$-organic solvent solution dispersion with a $SiO_2$ concentration of $8\times10^{-5}$-$6\times10^{-3}$ g/mL; diluting a tetrakis(hydroxymethyl)phosphonium sulfate (THPS) solution with distilled water to obtain a THPS diluent with a THPS concentration of $8\times10^{-4}$-$4\times10^{-2}$ g/mL; adding the THPS diluent drop by drop into the $SiO_2$-organic solvent solution dispersion while stirring; and continuing to stir for 5-45 minutes to obtain a mixed solution, wherein a weight ratio of the silicon dioxide nanoparticles to THPS is in a range of 1:0.7-4; and 2) dissolving p-phenylenediamine in the organic solvent to obtain a p-phenylenediamine solution with a p-phenylenediamine concentration of $4\times10^{-4}$-$6\times10^{-3}$ g/mL; adding the p-phenylenediamine solution drop by drop into the mixed solution obtained in step 1; reacting for 20-70 minutes; ultrasonically treating for 20-70 minutes; centrifuging; washing; and drying in vacuum at 40-50° C. to obtain the silicon dioxide nanoparticles modified by the polymer containing phosphorus and nitrogen.

In a preferred embodiment: a manufacturing method of the silicon dioxide nanoparticles comprises: mixing anhydrous ethanol, concentrated ammonia water and the distilled water; stirring until well mixed at 20-30° C.; adding tetraethoxysilane drop by drop; reacting at 20-30° C. for 22-26 hours while stirring, wherein a volume ratio of the anhydrous ethanol, the concentrated ammonia water, the distilled water and the tetraethoxysilane is in a range of 110-130:7-8:16-20:3-4; centrifuging; washing; and drying in vacuum at 40-50° C. for 22-26 hours to obtain the silicon dioxide nanoparticles.

In a preferred embodiment, the organic solvent is ethanol or methanol.

In a preferred embodiment, in step 1, ultrasonically dispersing comprises ultrasonically dispersing for 20-50 minutes to obtain the $SiO_2$-organic solvent dispersion solution, wherein the $SiO_2$-organic solvent dispersion solution has a $SiO_2$ concentration of $1\times10^{-4}$-$5\times10^{-3}$ g/mL.

In a preferred embodiment, in step 1, the THPS diluent has a THPS concentration of $1\times10^{-3}$-$3\times10^{-2}$ g/mL, and continuing to stir for 5-45 minutes comprises continuing to stir for 10-40 minutes.

In a preferred embodiment, in step 1, the THPS solution has a THPS concentration of 75 wt %, and the weight ratio of the silicon dioxide nanoparticles to the THPS solution having the THPS concentration of 75 wt % is in a range of 1:2-4.

In a preferred embodiment, in step 2, the p-phenylenediamine solution has a p-phenylenediamine concentration of $5\times10^{-4}$-$5\times10^{-3}$ g/mL, reacting for 20-70 minutes comprises reacting for 30-60 minutes, and ultrasonically treating for 20-70 minutes comprises ultrasonically treating for 30-60 minutes.

In a preferred embodiment, the silicon dioxide nanoparticles modified by the polymer containing phosphorus and nitrogen comprise a core-shell structure.

In a preferred embodiment, in step 2, washing comprises washing with the distilled water for 2-5 times and then washing with the organic solvent for 2-5 times, and drying in vacuum at 40-50° C. in step 2 comprises drying in vacuum at 40-50° C. for 10-15 hours.

A second technical solution adopted by the present disclosure is as follows:

Silicon dioxide nanoparticles modified by the polymer containing phosphorus and nitrogen manufactured according to the aforementioned method, the silicon dioxide nanoparticles modified by the polymer containing phosphorus and nitrogen comprise core-shell structure.

A third technical solution adopted by the present disclosure is as follows:

A use of the silicon dioxide nanoparticles modified by the polymer containing phosphorus and nitrogen, in a preparation of a flame-retardant polymer material.

In a preferred embodiment, in the flame-retardant polymer material, a weight ratio of the silicon dioxide nanoparticles modified by a polymer containing phosphorus and nitrogen is 0.4-5%.

A fourth technical solution adopted by the present disclosure is as follows:

A method for manufacturing flame-retardant epoxy resin by using the aforementioned silicon dioxide nanoparticles modified by the polymer containing phosphorus and nitrogen, wherein the method comprises: weighing epoxy resin; heating to 90-110° C.; adding the silicon dioxide nanoparticles modified by a polymer containing phosphorus and nitrogen pre-dissolved in a solvent into the epoxy resin; removing the solvent; adding a curing agent; and stirring until well mixed and pouring into a mold; holding at 110-130° C. for 3-5 hours; then holding at 130-150° C. for 1-3 hours; and finally holding at 150-170° C. for 1-3 hours to obtain the flame-retardant epoxy resin.

The method of manufacturing silicon dioxide nanoparticles modified by a polymer containing phosphorus and nitrogen is simple, raw materials are cheap and easy to be provided. Element phosphorus and element nitrogen can achieve a synergistic flame-retardant effect, after the silicon dioxide nanoparticles modified by the polymer containing phosphorus and nitrogen are added to epoxy resin as flame-retardant additives, the silicon dioxide nanoparticles modified by the polymer containing phosphorus and nitrogen can be uniformly dispersed in the epoxy resin, so that a thermal stability of the epoxy resin can be improved, and a carbon layer with a better thermal stability can be formed. Therefore, the silicon dioxide nanoparticles modified by the polymer containing phosphorus and nitrogen have broad application prospects in flame retardancy, strengthening effect and abrasion resistance of polymer materials, and are expected to be widely used in the halogen-free synergistic flame retardancy of polymer materials.

BRIEF DESCRIPTION OF THE DRAWINGS

The present disclosure is further described with the combination of the accompanying drawings together with the embodiments.

FIG. 1 illustrates a transmission electron microscopy (TEM) diagram of the silicon dioxide nanoparticles modified by the polymer containing phosphorus and nitrogen in embodiment 1 of the present disclosure. FIG. 1 is obtained under the following test conditions: Microscope is JEM-2100, acceleration voltage is 200 kV, magnification is 20000 x, camera length is —, and test time is 1-1-2017 at 9:55 am.

DETAILED DESCRIPTION OF THE EMBODIMENTS

The present disclosure is specifically described by the following embodiments.

Embodiment 1

1) After adding 120 mL anhydrous ethanol, 7.5 mL concentrated ammonia water and 18 mL distilled water into a 250 mL single-neck bottle, and stirring at 25° C. for 5 minutes, adding 3.8 mL tetraethoxysilane drop by drop through a constant pressure dropping funnel, and fully reacting at 25° C. for 24 hours while stirring, after the reaction is completed, then centrifuging at 10000 r/min for 10 minutes, washing with anhydrous ethanol for 3 times, putting in a vacuum oven at 45° C. for 24 hours, and then obtaining silicon dioxide nanoparticles;

adding 0.25 g of the silicon dioxide nanoparticles and 250 mL anhydrous ethanol into a 500 mL single-neck bottle, ultrasonically dispersing for 30 minutes, and obtaining a $SiO_2$-ethanol solution dispersion; in addition, diluting 0.75 g of 75 wt % THPS solution with 50 mL of distilled water, obtaining a THPS diluent; slowly dripping the THPS diluent into the aforementioned $SiO_2$-ethanol solution dispersion by a constant pressure dropping funnel while stirring, and then stirring for 20 minutes, obtaining a mixed solution;

2) weighing 0.30 g p-phenylenediamine, and dissolving in 60 mL anhydrous ethanol, obtaining a p-phenylenediamine solution, slowly dripping the p-phenylenediamine solution into the mixed solution obtained in step 1 in a single-neck bottle by a constant pressure dropping funnel, and then reacting for 30 minutes, and then ultrasonically treating for 30 minutes; centrifuging, washing for 3 times with distilled water, then washing for 3 times with anhydrous ethanol, drying in vacuum at 45° C. for 12 hours, obtaining silicon dioxide nanoparticles modified by a polymer containing phosphorus and nitrogen.

Embodiment 2

1) The method of manufacturing the silicon dioxide nanoparticles was the same as that of embodiment 1. Adding 0.25 g of the silicon dioxide nanoparticles and 250 mL anhydrous ethanol into a 500 mL single-neck bottle, ultrasonically dispersing for 30 minutes, and obtaining a $SiO_2$-ethanol solution dispersion; in addition, diluting 1.00 g of 75 wt % THPS solution with 50 mL of distilled water, obtaining a THPS diluent; slowly dripping the THPS diluent into the aforementioned $SiO_2$-ethanol solution dispersion by a constant pressure dropping funnel while stirring, and then stirring for 20 minutes, obtaining a mixed solution;

weighing 0.30 g p-phenylenediamine, and dissolving in 60 mL anhydrous ethanol, obtaining a p-phenylenediamine solution, slowly dripping the p-phenylenediamine solution into the mixed solution obtained in step 1 in a single-neck bottle by a constant pressure dropping funnel, and then reacting for 30 minutes, and then ultrasonically treating for 30 minutes; centrifuging, washing for 3 times with distilled water, then washing for 3 times with anhydrous ethanol, drying in vacuum at 45° C. for 12 hours, obtaining silicon dioxide nanoparticles modified by a polymer containing phosphorus and nitrogen.

Embodiment 3

1) The method of manufacturing the silicon dioxide nanoparticles is the same as that of embodiment 1. Adding 0.25 g of the silicon dioxide nanoparticles and 250 mL anhydrous ethanol into a 500 mL single-neck bottle, ultrasonically dispersing for 30 minutes, and obtaining a $SiO_2$-ethanol solution dispersion; in addition, diluting 0.50 g of 75 wt % THPS solution with 50 mL of distilled water, obtaining a THPS diluent; slowly dripping the THPS diluent into the aforementioned $SiO_2$-ethanol solution dispersion by a constant pressure dropping funnel while stirring, and then stirring for 20 minutes, obtaining a mixed solution;

weighing 0.15 g p-phenylenediamine, and dissolving in 60 mL anhydrous ethanol, obtaining a p-phenylenediamine solution, slowly dripping the p-phenylenediamine solution into the mixed solution obtained in step 1 in a single-neck bottle by a constant pressure dropping funnel, and then reacting for 30 minutes, and then ultrasonically treating for 30 minutes; centrifuging, washing for 3 times with distilled water, then washing for 3 times with anhydrous ethanol, drying in vacuum at 45° C. for 12 hours, obtaining silicon dioxide nanoparticles modified by a polymer containing phosphorus and nitrogen.

Embodiment 4

A method of manufacturing pure epoxy resin, a method of manufacturing epoxy resin modified by the silicon dioxide nanoparticles modified by the polymer containing phosphorus and nitrogen obtained by embodiment 1 of the present disclosure, and a method of flame retardancy test are as follow.

(1) A method of manufacturing pure epoxy resin is as follows:

weighting 30 g epoxy resin E-51, heating to 100° C., adding 7.5 g 4,4'-diamino-diphenyl methane as a curing agent, stirring until well mixed, and pouring into a mold, holding at 120° C. for 4 hours, then holding at 140° C. for 2 hours, and finally holding at 160° C. for 2 hours.

(2) A method of manufacturing epoxy resin modified by the silicon dioxide nanoparticles modified by the polymer containing phosphorus and nitrogen obtained by embodiment 1 of the present disclosure is as follows:

weighting 30 g of epoxy resin E-51, heating to 100° C., weighting 0.18 g of the silicon dioxide nanoparticles modified by the polymer containing phosphorus and nitrogen, dissolving in anhydrous ethanol, ultrasonically treating for 30 minutes, slowly adding into the epoxy resin E-51, removing the ethanol in vacuum, adding 7.5 g 4,4'-diamino-diphenyl methane as a curing agent, stirring until well mixed, and pouring into a mold, holding at 120° C. for 4 hours, then holding at 140° C. for 2 hours, and finally holding at 160° C. for 2 hours, obtaining an epoxy resin modified by a reactive flame retardant agent, in which an amount of the silicon dioxide nanoparticles modified by the polymer containing phosphorus and nitrogen is 0.5% (corresponding to EP-0.5% in Table 1). According to the method, by respectively adding 0.37 g and 0.76 g of the silicon dioxide nanoparticles modified by the polymer containing phosphorus and nitrogen into 30 g of the epoxy resin E-51 and obtaining two epoxy resins modified by a reactive flame retardant agent, an amount of the silicon dioxide nanoparticles modified by the polymer containing phosphorus and nitrogen in the two epoxy resins modified by a reactive flame retardant agent are 1% (corresponding to EP-1% in Table 1) and 2% (corresponding to EP-2% in Table 1), respectively.

(3) An oxygen index of the samples was tested under a method of the GB/T 2406.2-2009.

TABLE 1

Test results of a limiting oxygen index (LOI) of the epoxy resin modified by the silicon dioxide nanoparticles modified by the polymer containing phosphorus and nitrogen obtained in embodiment 1 of the present invention

| Sample | Epoxy resin E-51 (g) | Modified $SiO_2$ nanoparticles (g) | Curing agent (g) | LOI (%) |
|---|---|---|---|---|
| EP-0% | 30 | 0 | 7.5 | 25.3 |
| EP-0.5% | 30 | 0.18 | 7.5 | 28.0 |
| EP-1% | 30 | 0.37 | 7.5 | 29.0 |
| EP-2% | 30 | 0.76 | 7.5 | 29.7 |

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method for manufacturing modified silicon dioxide nanoparticles-, the method comprising:

1) dispensing silicon dioxide nanoparticles in an organic solvent and ultrasonically dispersing for 10-60 minutes to obtain a $SiO_2$-organic solvent solution dispersion with a $SiO_2$ concentration of $8\times10^{-5}$-$6\times10^{-3}$ g/mL; diluting a tetrakis_(hydroxymethyl)_phosphonium sulfate (THPS) solution with distilled water to obtain a THPS diluent with a THPS concentration of $8\times10^{-4}$-$4\times10^{-2}$ g/mL; adding the THPS diluent drop by drop into the $SiO_2$-organic solvent solution dispersion while stirring; and continuing to stir for 5-45 minutes to obtain a mixed solution, wherein a weight ratio of the silicon dioxide nanoparticles to the THPS solution is in a range of 1:0.7-4; and 2) dissolving p-phenylenediamine in the organic solvent to obtain a p-phenylenediamine solution with a p-phenylenediamine concentration of $4\times10^{-4}$-$6\times10^{-3}$ g/mL; adding the p-phenylenediamine solution drop by drop into the mixed solution obtained in step 1; reacting for 20-70 minutes; ultrasonically treating for 20-70 minutes; centrifuging; washing; and drying in vacuum at 40-50° C. to obtain the modified silicon dioxide nanoparticles.

2. The method of claim 1, wherein a manufacturing method of the silicon dioxide nanoparticles comprises:

mixing anhydrous ethanol, concentrated ammonia water and the distilled water; stirring until mixed at 20-30° C.; adding tetraethoxysilane drop by drop; reacting at 20-30° C. for 22-26 hours while stirring, wherein a volume ratio of the anhydrous ethanol, the concentrated ammonia water, the distilled water and the tetraethoxysilane is in a range of 110-130:7-8:16-20:3-4; centrifuging;

washing; and drying in vacuum at 40-50° C. for 22-26 hours to obtain the silicon dioxide nanoparticles.

3. The method of claim 1, wherein the organic solvent is ethanol or methanol.

4. The method of claim 1, wherein in step 1, ultrasonically dispersing comprises ultrasonically dispersing for 20-50 minutes to obtain the $SiO_2$-organic solvent solution dispersion, wherein the $SiO_2$-organic solvent solution dispersion has a $SiO_2$ concentration of $1\times10^{-4}$-$5\times10^{-3}$ g/mL.

5. The method of claim 1, wherein in step 1, the THPS diluent has a THPS concentration of $1\times10^{-3}$-$3\times10^{-2}$ g/mL, and continuing to stir for 5-45 minutes comprises continuing to stir for 10-40 minutes.

6. The method of claim 1, wherein in step 1, the THPS solution has a THPS concentration of 75 wt %, and the weight ratio of the silicon dioxide nanoparticles to the THPS solution having the THPS concentration of 75 wt % is in a range of 1:2-4.

7. The method of claim 1, wherein in step 2, the p-phenylenediamine solution has a p-phenylenediamine concentration of $5\times10^{-4}$-$5\times10^{-3}$ g/mL, reacting for 20-70 minutes comprises reacting for 30-60 minutes, and ultrasonically treating for 20-70 minutes comprises ultrasonically treating for 30-60 minutes.

8. The method of claim 1, wherein the modified silicon dioxide nanoparticles comprise a core-shell structure.

9. The method of claim 1, wherein in step 2, washing comprises washing with the distilled water for 2-5 times and then washing with the organic solvent for 2-5 times, and drying in vacuum at 40-50° C. in step 2 comprises drying in vacuum at 40-50° C. for 10-15 hours.

10. The method of claim 2, wherein the organic solvent is ethanol or methanol.

11. The method of claim 2, wherein in step 1, ultrasonically dispersing comprises ultrasonically dispersing for 20-50 minutes to obtain the SiO$_2$-organic solvent solution dispersion, wherein the SiO$_2$-organic solvent solution dispersion has a SiO$_2$ concentration of $1\times10^{-4}$-$5\times10^{-3}$ g/mL.

12. The method of claim 2, wherein the modified silicon dioxide nanoparticles comprise a core-shell structure.

13. The method of claim 3, wherein the modified silicon dioxide nanoparticles comprise a core-shell structure.

14. The method of claim 10, wherein the modified silicon dioxide nanoparticles comprise a core-shell structure.

15. The method of claim 4, wherein in step 1, the THPS diluent has a THPS concentration of $1\times10^{-3}$-$3\times10^{-2}$ g/mL, and continuing to stir for 5-45 minutes comprises continuing to stir for 10-40 minutes.

* * * * *